United States Patent [19]

Jenkins

[11] 4,385,095

[45] May 24, 1983

[54] WIDE ANGULAR RANGE X-RAY DIFFRACTION REFERENCE STANDARD COMPOSITE

[75] Inventor: Ronald Jenkins, Peekskill, N.Y.

[73] Assignee: North American Philips Corporation, New York, N.Y.

[21] Appl. No.: 382,016

[22] Filed: May 26, 1982

[51] Int. Cl.[3] .......... B32B 9/04

[52] U.S. Cl. .......... 428/446; 428/451; 428/699; 428/913; 427/419.8; 427/160; 250/252.1; 378/207

[58] Field of Search .......... 428/543, 913, 336, 446, 428/699, 451; 427/160, 126.1, 419.8; 250/252.1; 378/207

[56] References Cited

U.S. PATENT DOCUMENTS

| | | | |
|---|---|---|---|
| 2,857,291 | 10/1958 | Oksim | 427/419.8 X |
| 2,864,725 | 12/1958 | Sorg et al. | 427/419.8 X |

FOREIGN PATENT DOCUMENTS

| | | | |
|---|---|---|---|
| 688823 | 9/1979 | U.S.S.R. | 378/207 |

*Primary Examiner*—P. Ives

*Attorney, Agent, or Firm*—Paul R. Miller

[57] ABSTRACT

A unique composite structure is provided for calibration of diffractometer at low values of $2\theta$. This composite structure involves a layer of silicon powder and a plurality of monolayers of a heavy metal stearate on the silicon powder. A lead stearate layered material has been found to provide significant results for enabling calibration below 20°.

3 Claims, 2 Drawing Figures

WIDE ANGULAR RANGE X-RAY DIFFRACTION REFERENCE STANDARD COMPOSITE

Figure 1:
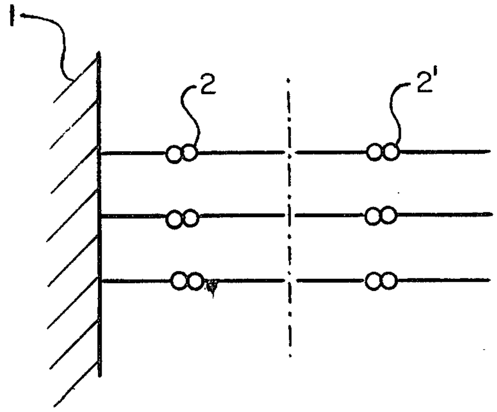

The present invention is directed to a new structure of composite material providing a wide angular range reference standard for use in X-ray diffractometers.

In alignment procedures for powder diffractometers, calibration standards are required to determine the shape of the curve of angular error versus angle. No single calibration standard is ideal for this purpose, thereby leading, in practice, to the use of two standards: one for low angles and the other for medium/high angles.

In setting up a powder diffractometer for obtaining a set of "d" values, numerous random and systematic errors, some of which are inherent to a given diffractometer configuration and some of which may result from incorrect alignment of the diffractometer or technique in establishing peak positions and subsequent calculation of "d" values, may occur. Two particular problems occur in practice. The first problem concerns the measurement of an error curve on the diffractometer to establish the integrity of alignment, and the second problem relates to the need to correct experimental data for geometrical errors, plus additional errors which may relate to the sample itself, such as a specimen displacement error.

The first of these two problems is generally managed with an external instrument standard, and the second of these problems may be managed with an internal standard. For the external instrument standard, a surface ground novaculite ($\alpha$-quartz) specimen may be used. For the internal standard, the NBS SRM-640 silicon powder is used. This provides a quite successful procedure for diffraction angles down to 20° or so, but does not allow success in the low angle regions. Difficulties often occur in recording calibration data at low $2\theta$ because of the problems in finding material of suitably large "d" values.

The silicon SRM standard gives a first line at about 28°, which is unfortunate because the low angle region is one in which systematic errors are large and which if uncorrected results in very poor "d" values. Reasonably accurate values of "d" are required both for computer search matching and cell indexing. Misalignment errors usually occur in the form of a zero angle calibration error or a missetting of the $2\theta/\theta$ axes. The zero angle error introduces an error in "d" in terms of Cot$\theta$ and tends to be large at low $2\theta$ values, i.e. large "d" values. The $2\theta/\theta$ misalignment does not markedly effect the accuracy of the measured "d" value since the major effect of this aberration causes asymmetric broadening of the diffraction profile which has only a small effect on shifting the peak position. In practice, either or both of these effects can be sufficiently minimized by careful alignment of the diffractometer.

However, in order to avoid these problems and to achieve reasonably accurate values of "d" at low angles, it has been determined that a composite material provides satisfactory results. Namely, it has been found in the present invention that the use of heavy metal stearates, typified by lead stearate, achieves calibration standards which are quite useful at low angular values.

In order to avoid, the use of two separate standards and two separate measurements, i.e. one to check diffractometer calibration at low $2\theta$ values and another to check $2\theta$ values at medium or high angular values, a composite standard has been fabricated in which both silicon, providing the mid and high angular value calibration, and a heavy metal stearate providing the low angle calibration, are used. That is, the composite material provides for the deposition of stearate layers onto the surface of a pressed silicon powder.

It has been determined that the sequential deposition of monolayers of the heavy stearate onto the pressed silicon powder results in very stable composite calibration standard material.

These lead to a composite calibration standard material which enables calibration at both low angle values and mid or high value angles.

Figure 2:
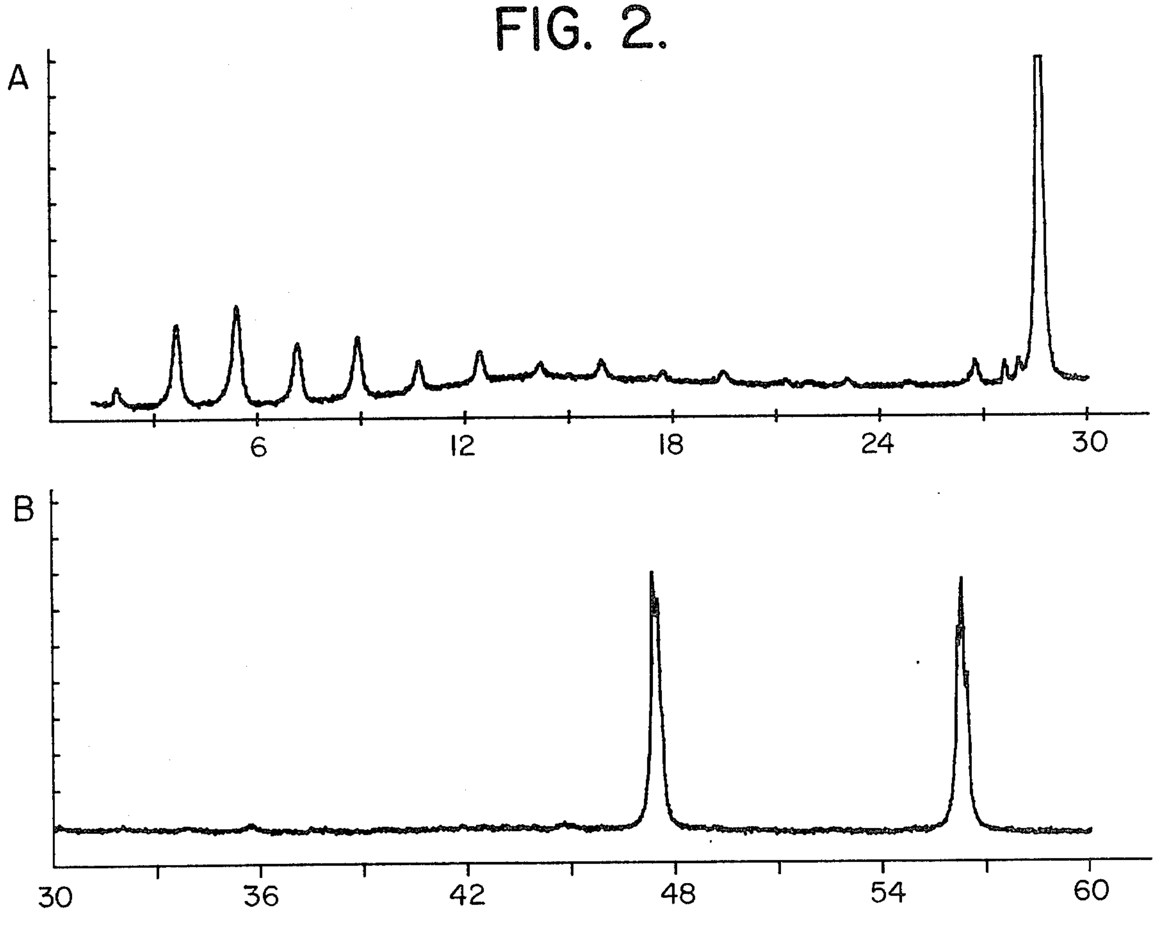

The various aspects and embodiments of the present invention are illustrated in the drawing figures which set forth features of the present invention without limitation, and wherein:

FIG. 1 provides a partial illustration of the molecular structure of the composite material of the present invention; and FIG. 2 illustrates a diffractogram for the composite crystal according to the present invention.

In FIG. 1 the pressed silicon powder of SRM standard is provided as a substrate 1 for the sequential monolayers of heavy metal stearate 2, 2', etc. Each monolayer is in a back-to-back form to provide layers 2, 2', etc. Such heavy metal stearate may be in the form of lead stearate having a "d" spacing of about 50 A. Such a calibration standard in a well aligned diffractometer enables the observation of about 30 harmonics.

The structure in FIG. 1 is designed to provide a number of layers of the monolayers of the stearates. For example, the Langmuir-Bloggett dipping method can be used to obtain 100 to 250 monolayers of the heavy metal stearate. This deposition technique achieves very stable composite materials.

FIG. 2 illustrates a diffractogram of such a composite crystal in accordance with the present invention in which both lead stearate and silicon lines are observed. This composite structure allows a reliable determination of low angle calibration, together with normal calibration information for the silicon material. The composite is a standard which covers a full and wide angular range for the diffractometer thereby greatly reducing the tedium of alignment.

While an embodiment of the present invention has been illustrated, all variations and embodiments of the present invention which are evident from the attached claims are included.

What I claim:

1. A composite structure providing an extended reference standard for X-ray diffraction comprising a layer of silicon powder, and a plurality of monolayers of a heavy metal stearate on said silicon powder, said monolayers being provided one on top of another and providing an extended linear molecular complex having defined lengths.

2. A composite structure according to claim 1, wherein said heavy metal stearate is lead stearate.

3. A composite structure according to claim 1, wherein said defined lengths are multiples of 50 A.

* * * * *